US009565706B2

(12) United States Patent
Yue

(10) Patent No.: US 9,565,706 B2
(45) Date of Patent: Feb. 7, 2017

(54) METHOD AND WIRELESS TERMINAL DEVICE FOR RAPIDLY ESTABLISHING DUAL-STACK WIRELESS CONNECTION

(75) Inventor: Zonghe Yue, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 427 days.

(21) Appl. No.: 14/347,934

(22) PCT Filed: Feb. 24, 2012

(86) PCT No.: PCT/CN2012/071631
§ 371 (c)(1),
(2), (4) Date: Mar. 27, 2014

(87) PCT Pub. No.: WO2013/075423
PCT Pub. Date: May 30, 2013

(65) Prior Publication Data
US 2014/0237128 A1     Aug. 21, 2014

(30) Foreign Application Priority Data
Nov. 22, 2011   (CN) .......................... 2011 1 0374386

(51) Int. Cl.
*G06F 15/16*     (2006.01)
*H04W 76/02*    (2009.01)
(Continued)

(52) U.S. Cl.
CPC .......... *H04W 76/02* (2013.01); *H04L 61/6086* (2013.01); *H04L 69/167* (2013.01);
(Continued)

(58) Field of Classification Search
CPC ... H04L 69/167; H04W 76/025; H04W 76/04; H04W 80/045; H04W 12/02
See application file for complete search history.

(56) References Cited

U.S. PATENT DOCUMENTS 7,443,859 B2   10/2008  Sengodan
8,566,455 B1 * 10/2013  Zhao .................. H04W 76/025
                                                           709/227
(Continued)

FOREIGN PATENT DOCUMENTS

CN     101277470 A   10/2008
CN     101483635 A    7/2009
(Continued)

OTHER PUBLICATIONS

Change of Network PDP type at change from LTE to 2G/3G or within 2G/3G, mailed on Sep. 4, 2009.
(Continued)

*Primary Examiner* — Richard G Keehn
(74) *Attorney, Agent, or Firm* — Oppedahl Patent Law Firm LLC

(57) ABSTRACT

A method and wireless terminal device for rapidly establishing a dual-stack wireless connection. The wireless terminal device sends various types of packet data protocol (PDP) activation requests after being registered onto a wireless network, and determines an Internet Protocol (IP) type supported by the network based on a result returned by the network; after receiving a connection instruction from a user, the wireless terminal device initiates one PDP activation request corresponding to a determined IP type supported by the network; if a result that the PDP activation is performed successfully is returned by the network, the wireless terminal device establishes a data connection. Compared to the related art, the wireless terminal device of the present disclosure determines the IP type supported by the network in advance when it is registered onto the network, and thus may prevent a fall-back process and rapidly establish the connection when receiving the connection instruction.

8 Claims, 3 Drawing Sheets

(51) Int. Cl.
  *H04W 12/02*  (2009.01)
  *H04W 76/04*  (2009.01)
  *H04W 80/04*  (2009.01)
  *H04L 29/06*  (2006.01)
  *H04L 29/12*  (2006.01)

(52) U.S. Cl.
  CPC ......... *H04W 12/02* (2013.01); *H04W 76/022* (2013.01); *H04W 76/025* (2013.01); *H04W 76/04* (2013.01); *H04W 80/045* (2013.01); *H04L 61/2007* (2013.01); *H04W 76/027* (2013.01)

(56) References Cited

U.S. PATENT DOCUMENTS

| | | | |
|---|---|---|---|
| 2003/0112793 | A1 | 6/2003 | Sengodan |
| 2011/0007671 | A1 | 1/2011 | Yu |
| 2011/0038372 | A1* | 2/2011 | Wijayanathan ......... H04W 8/26 370/389 |
| 2012/0202491 | A1* | 8/2012 | Fox ...................... H04B 7/2609 455/435.1 |
| 2012/0246325 | A1* | 9/2012 | Pancorbo Marcos ............... H04L 12/2602 709/227 |
| 2013/0010645 | A1 | 1/2013 | Yu |

FOREIGN PATENT DOCUMENTS

| | | |
|---|---|---|
| CN | 101540995 A | 9/2009 |
| CN | 101997934 A | 3/2011 |
| CN | 102088494 A | 6/2011 |
| EP | 2249522 A1 | 11/2010 |
| WO | 03052961 A1 | 6/2003 |

OTHER PUBLICATIONS

3GPP TS 23.401 v8.14.0, Jun. 2011.
3GPP TR 23.975 v11.0.0, Jun. 10, 2011.
Select the Proper PDN/PDP Type for Multi-mode Terminals with IPv6 Support, mailed on Feb. 15, 2011.
Supplementary European Search Report in European application No. 12852095.4, mailed on Mar. 17, 2015.
International Search Report in international application No. PCT/CN2012/071631, mailed on Aug. 23, 2012.
English Translation of the Written Opinion of the International Search Authority in international application No. PCT/CN2012/071631, mailed on Aug. 23, 2012.

* cited by examiner

METHOD AND WIRELESS TERMINAL DEVICE FOR RAPIDLY ESTABLISHING DUAL-STACK WIRELESS CONNECTION

TECHNICAL FIELD

The present disclosure relates to communications technology, and in particular to a method and wireless terminal device for rapidly establishing dual-stack connection.

BACKGROUND

IPv4 protocol is a widely deployed Internet protocol at present. However, with the rapid development of the Internet, design deficiencies of the IPv4 have become increasingly apparent, for example, the address space is insufficient, the number of table entries in a routing table maintained by a backbone router is too large to perform automatic configuration and re-addressing, and a security problem is too difficult to solve. IPv6, as a future alternative protocol of IPv4, has advantages such as a sufficient address space, a high routing efficiency, a high security and is easy to configure and extend, and also supports a mobility feature.

At present, a large number of networks are IPv4 networks, while with the deployment of the IPv6 protocol, there is a long-term transition stage in which the IPv4 and the IPv6 coexist. Dual-stack technology is effectively applied in the transition from the IPv4 to the IPv6, in which a node in the network simultaneously supports both IPv4 and IPv6 protocol stacks, different protocol stacks are selected for a source node based on different target nodes, and a network device selects different protocol stacks to perform processing and forwarding based on different protocol types for messages.

With the popularization of the computer (PC) and the rapid development of the communications service, the PC as well as communications has been already extensively applied in every aspect of people's life. It will bring a great convenience by applying a wireless terminal device on a PC, therefore a fixed network service, which has a relatively slow speed and is complicated to mount and maintain, is bound to be replaced by the wireless terminal device having a large development space in the following several years. There will be a general trend to simultaneously access the wireless terminal device into both the IPv4 and IPv6 networks.

At present, a wireless network operator has no uniform standard to support the IPv6 and there are various ways to implement IPv4 and IPv6 dual-stack network. This requires an attempting and fall-back mechanism for the wireless terminal device when it is accessed into the network. A general means based on the protocol is that: the wireless terminal device attempts to send an IPv4v6 single packet data protocol (PDP) activation request to establish a dual-stack connection firstly; if the attempt fails, the wireless terminal device falls back and attempts to send an IPv4 PDP activation request and an IPv6 PDP activation request to establish the dual-stack connection; if the attempt fails, then the wireless terminal device attempts to establish a single-stack connection. By such a means, it is relatively slow to establish the connection, and thus affecting the speed of network connection for a user.

SUMMARY

To remedy these defects, the present disclosure provides a method for rapidly establishing a dual-stack wireless connection, including: a wireless terminal device sends various types of packet data protocol (PDP) activation requests based on a certain order after being registered onto a wireless network, and determines an IP type supported by the network based on a result returned by the network; after receiving a connection instruction from a user, the wireless terminal device initiates one type of PDP activation request corresponding to the determined IP type supported by the network; if a result that the PDP activation is performed successfully is returned by the network, the wireless terminal device establishes a data connection.

Further, the wireless terminal device may send an IPv4v6 single-PDP activation request after being registered onto a wireless network, and wait for a result returned by the network; if a result that the IPv4v6 single-PDP activation is performed successfully is returned by the network, the wireless terminal device may send an IPv4v6 de-activation request, set the IP type of the network as an IPv4v6 single-PDP dual-stack, and enter a standby state; otherwise, the wireless terminal device may send an IPv4 PDP activation request and an IPv6 PDP activation request, and wait for a result returned by the network.

Further, after the wireless terminal device sends the IPv4 PDP activation request and the IPv6 PDP activation request, if a result that both the IPv4 and IPv6 are successfully supported is returned by the network, the wireless terminal device may send an IPv4 de-activation request and an IPv6 de-activation request, set the IP type of the network as an IPv4v6 dual-PDP dual-stack, and enter the standby state.

Further, after the wireless terminal device sends the IPv4 PDP activation request and the IPv6 PDP activation request, if a result that the IPv4 is successfully supported and the IPv6 is not supported is returned by the network, the wireless terminal device may send an IPv4 de-activation request, set the IP type of the network as an IPv4 single-PDP single-stack, and enter the standby state.

Further, after the wireless terminal device sends the IPv4 PDP activation request and the IPv6 PDP activation request, if a result that the IPv4 is not supported and the IPv6 is successfully supported is returned by the network, the wireless terminal device may send an IPv6 de-activation request, set the IP type of the network as an IPv6 single-PDP single-stack, and enter the standby state.

Further, after the wireless terminal device sends the IPv4 PDP activation request and the IPv6 PDP activation request, if a result that neither the IPv4 nor the IPv6 is supported is returned by the network, the wireless terminal device may set the IP type of the network as unknown, and enter the standby state.

The present disclosure also provides a wireless terminal device for rapidly establishing a dual-stack wireless connection, including: a network connection module and a network IP type searching module; wherein, the network IP type searching module is configured to, after being registered onto a wireless network, send various types of packet data protocol (PDP) activation requests, and determine an IP type supported by the network based on a result returned by the network;

the network connection module is configured to, after receiving a connection instruction from a user, initiate one type of PDP activation request corresponding to the determined IP type supported by the network.

Further, the wireless terminal device may be configured to send an IPv4v6 single-PDP activation request, and wait for a result returned by the network; if a result that the IPv4v6 single-PDP activation is performed successfully is returned by the network, the wireless terminal device may send an IPv4v6 de-activation request, set the IP type of the network as an IPv4v6 single-PDP dual-stack, and enter a standby state; otherwise, the wireless terminal device may send an IPv4 PDP activation request and an IPv6 PDP activation request, and wait for a result returned by the network.

Further, after the wireless terminal device sends an IPv4 PDP activation request and an IPv6 PDP activation request, if a result that both the IPv4 and IPv6 are successfully supported is returned by the network, the wireless terminal device may send an IPv4 de-activation request and an IPv6 de-activation request, set the IP type of the network as an IPv4v6 dual-PDP dual-stack, and enter the standby state.

Further, after the wireless terminal device sends an IPv4 PDP activation request and an IPv6 PDP activation request, if a result that the IPv4 is successfully supported and the IPv6 is not supported is returned by the network, the wireless terminal device may send an IPv4 de-activation request, set the IP type of the network as an IPv6 single-PDP single-stack, and enter the standby state.

Further, after the wireless terminal device sends an IPv4 PDP activation request and an IPv6 PDP activation request, if a result that the IPv4 is not supported and the IPv6 is successfully supported is returned by the network, the wireless terminal device may send an IPv6 de-activation request, set the IP type of the network as an IPv4 single-PDP single-stack, and enter the standby state.

Further, after the wireless terminal device sends an IPv4 PDP activation request and an IPv6 PDP activation request, if a result that neither the IPv4 nor the IPv6 is supported is returned by the network, the wireless terminal device may set IP type of the network as unknown, and enter the standby state.

In conclusion, the present disclosure has the following advantageous effect:

compared to the related art, the wireless terminal device of the present disclosure determines the IP type supported by the network in advance when it is registered onto the network, and thus may prevent a fall-back process and may rapidly establish the connection when receiving the connection instruction.

DETAILED DESCRIPTION

According to the technical solutions of the present disclosure, when a wireless terminal device receives a connection instruction initiated by a user, it may prevent a complicated and time consuming attempting and fall-back process, and may directly initiate a PDP activation request supported by a current network to rapidly establish a network connection.

To overcome the problems such as the complicated and time consuming attempting and fall-back mechanism for establishing the IPv4IPv6 dual-stack wireless connection in the related art, the present disclosure provides a method for rapidly establishing an IPv4IPv6 dual-stack wireless connection.

The method that a wireless terminal device rapidly establishes the IPv4IPv6 dual-stack wireless connection of the present disclosure includes the following steps.

The wireless terminal device is started and registered onto a wireless network;

the wireless terminal device sends various types of PDP activation requests based on a certain order, and determines an IP type supported by the current network based on a result returned by the network;

the wireless terminal device enters a standby state;

after receiving a network connection instruction from a user, the wireless terminal device initiates one PDP activation request corresponding to the IP type supported by the current network determined in the second step;

if the network returns a result that the PDP activation is performed successful, a data connection is established by the wireless terminal device.

The technical solutions of the present disclosure are elaborated below with reference to the accompanying drawings and specific implementing modes.

Figure 1:
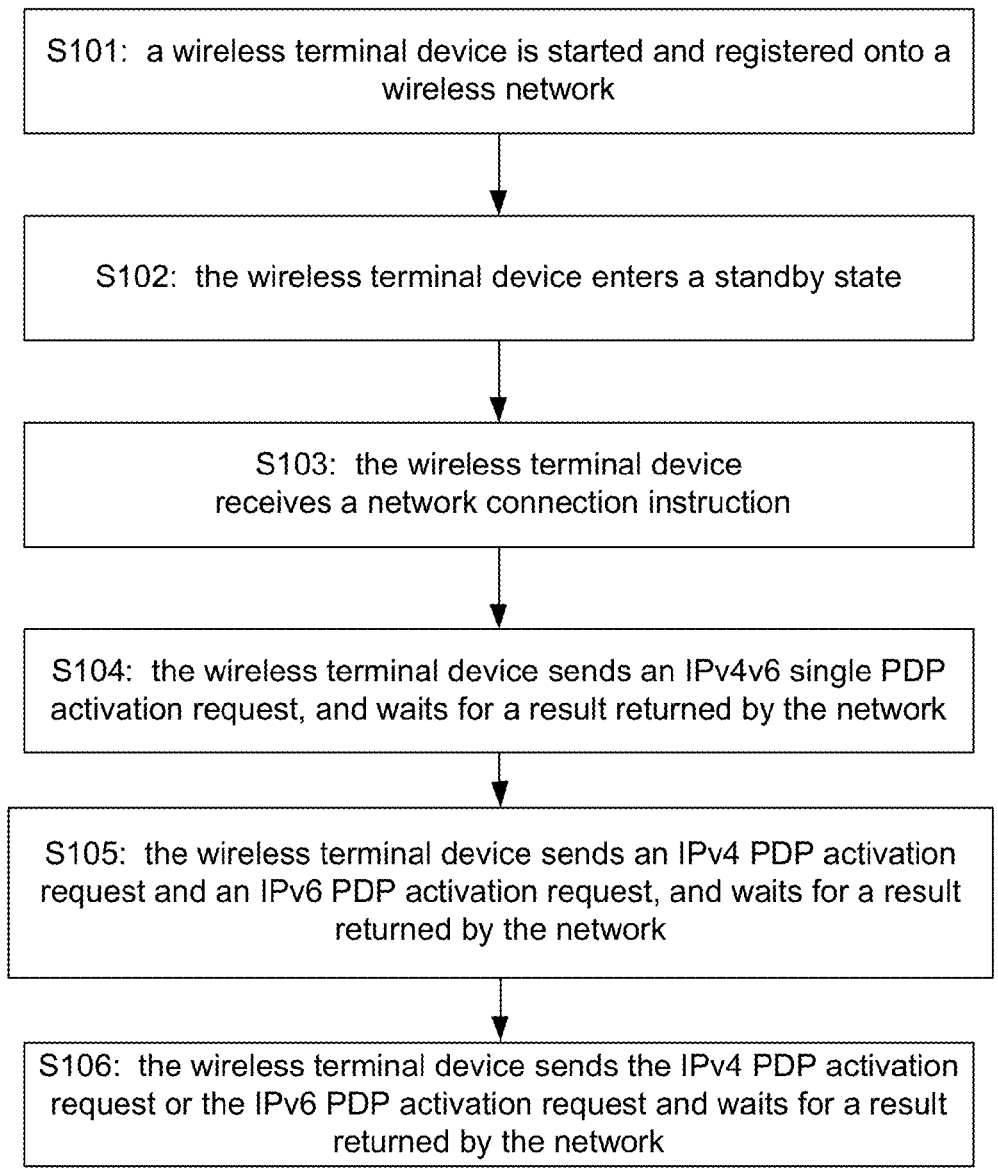
FIG. 1 is a flow chart of a method for establishing an IPv4IPv6 dual-stack connection for a wireless terminal device in the related art.

As shown in FIG. 1, it is a flow chart of a method for establishing an IPv4IPv6 dual-stack connection for a wireless terminal device in the related art. The method includes the following steps.

In S101, a wireless terminal device is started and registered onto a wireless network.

In S102, the wireless terminal device enters a standby state.

In S103, the wireless terminal device receives a network connection instruction.

In S104, the wireless terminal device sends an IPv4v6 single PDP activation request, and waits for a result returned by the network, if the network returns a result that the IPv4v6 single PDP activation is performed successfully, then a data connection is established; otherwise, go to step S105.

In S105, the wireless terminal device sends an IPv4 PDP activation request and an IPv6 PDP activation request, and waits for a result returned by the network, if the network returns a result that the IPv4 is successfully supported and the IPv6 is not supported, then the data connection for IPv4 is established; if the network returns a result that the IPv4 is not supported and the IPv6 is successfully supported, then the data connection for IPv6 is established; if the network returns a result that neither the IPv4 nor the IPv6 is supported, then go to step S106.

In S106, the wireless terminal device sends an IPv4 PDP activation request or an IPv6 PDP activation request and waits for a result returned by the network, if the network returns a successful result, then the data connection for IPv4 or IPv6 is established; otherwise, the standby state is entered.

It may be seen that the general connection process in the related art is complicated and time consuming.

Figure 2:
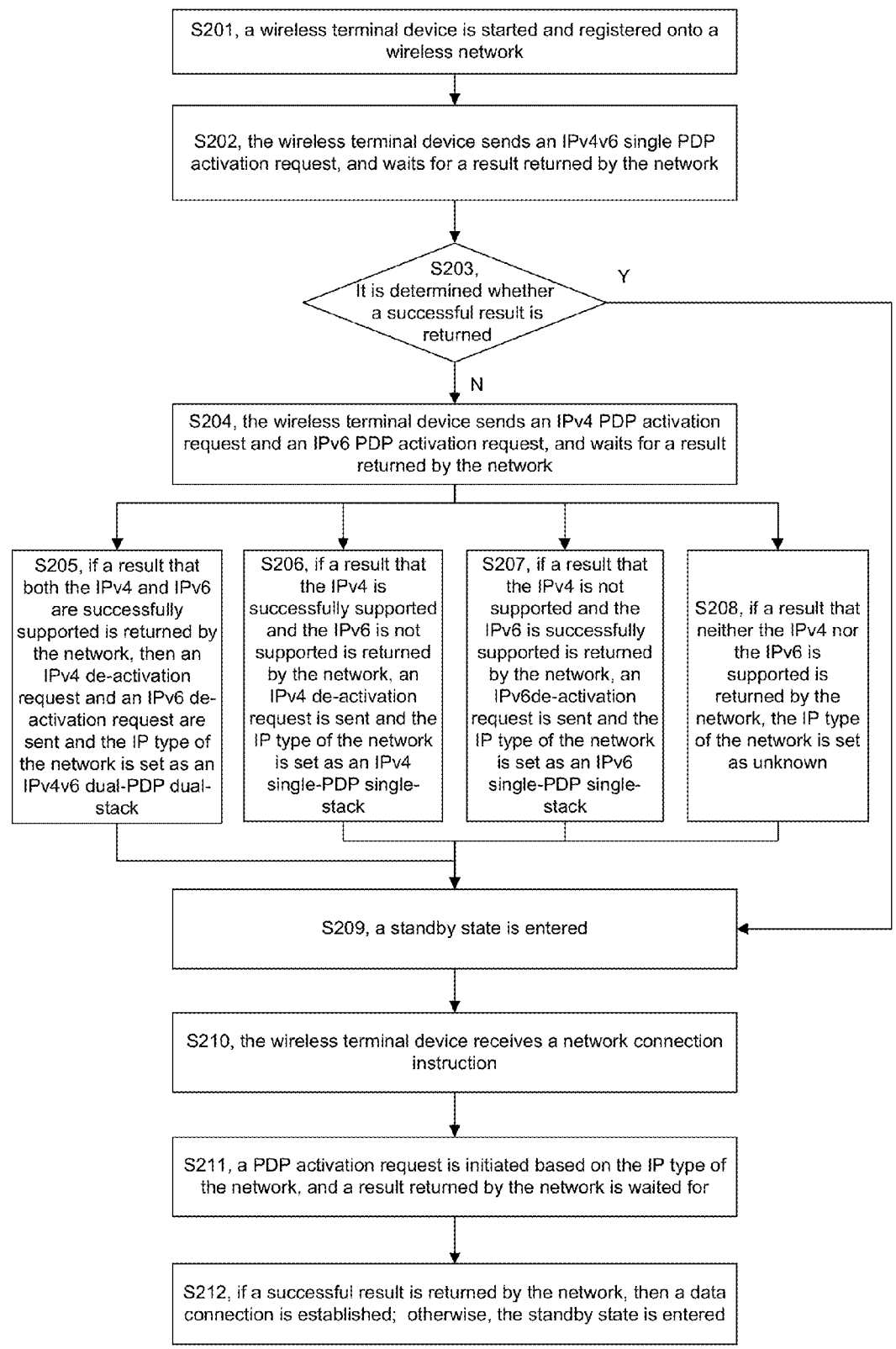
FIG. 2 is a flow chart of a method for rapidly establishing an IPv4IPv6 dual-stack connection for a wireless terminal device in an embodiment of the present disclosure.

FIG. 2 is a flow chart of a method for rapidly establishing an IPv4IPv6 dual-stack connection for a wireless terminal device in an embodiment of the present disclosure. The method includes the following steps.

In S201, a wireless terminal device is started and registered onto a wireless network.

In S202, the wireless terminal device sends an IPv4v6 single PDP activation request, and waits for a result returned by the network.

In S203, the wireless terminal device determines whether a successful result is returned, if so, then the wireless terminal device sends an IPv4v6 de-activation request and sets a network IP type as an IPv4v6 single-PDP dual-stack, and go to step S209; otherwise, go to step S204.

In S204, the wireless terminal device sends an IPv4 PDP activation request and an IPv6 PDP activation request, and waits for a result returned by the network.

In S205, if the network returns that both the IPv4 and IPv6 are successfully supported, then the wireless terminal device sends an IPv4 de-activation request and an IPv6 de-activation request and sets the network IP type as an IPv4v6 dual-PDP dual-stack; then go to step S209.

In S206, if the network returns that the IPv4 is successfully supported and the IPv6 is not supported, the wireless terminal device sends an IPv4 de-activation request and sets the network IP type as an IPv4 single-PDP single-stack: then go to step S209.

In S207, if the network returns that the IPv4 is not supported and the IPv6 is successfully supported, the wireless terminal device sends an IPv6 de-activation request and sets the network IP type as an IPv6 single-PDP single-stack; then go to step S209.

In S208, if the network returns that neither the IPv4 nor the IPv6 is supported, the wireless terminal device sets the network IP type as unknown; then go to step S209.

In S209, the wireless terminal device enters a standby state.

In S210, the wireless terminal device receives a network connection instruction.

In S211, the wireless terminal device initiates a PDP activation request corresponding to the network IP type, and waits for a result returned by the network.

In S212, if the network returns a result that the PDP activation is performed successfully, then a data connection is established; otherwise, the standby state is entered.

Figure 3:
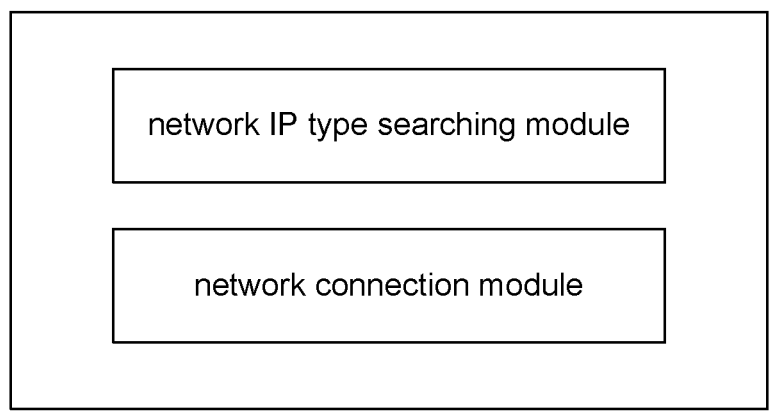
FIG. 3 is a schematic diagram illustrating modules of a wireless terminal device in an embodiment of the present disclosure.

FIG. 3 is a schematic diagram illustrating modules of a wireless terminal device in an embodiment of the present disclosure. The wireless terminal device includes: a network connection module and a network IP type searching module.

The network IP type searching module is configured to, after being registered onto a wireless network, send a PDP activation request, and determines an IP type supported by the current network based on a result returned by the network;

the network connection module is configured to, after receiving a connection instruction, initiate a PDP activation request corresponding to a determined IP type supported by the current network.

The problems such as the complicated and time consuming attempting and fall-back mechanism for establishing the IPv4IPv6 dual-stack wireless connection in the related art is overcome by the present disclosure. The wireless terminal device determines an IP type supported by a network in advance when it is registered onto the network, and thus may prevent a fall-back process and rapidly establish a connection when receiving a connection instruction.

The present disclosure may also include various implementing modes. Of course, various modifications or variations may be made by those skilled in the art according to the present disclosure without departing from the spirit and substance of the present disclosure, and any modifications, equivalent replacements as well as improvements made within the spirit and principle of the present disclosure shall fall in the protection scope of the present disclosure.

The invention claimed is:

1. A method for rapidly establishing a dual-stack wireless connection, comprising:

sending, by a wireless terminal device, after being registered onto a wireless network, an IPv4v6 single packet data protocol (PDP) activation requests, and waiting for a result returned by the network;

if a result that the IPv4v6 single-PDP activation is performed successfully is returned by the network, sending, by the wireless terminal device, an IPv4v6 de-activation request, setting, by the wireless terminal device, the IP type of the network as an IPv4v6 single-PDP dual-stack, and entering a standby state;

otherwise, sending, by the wireless terminal device, an IPv4 PDP activation request and an IPv6 PDP activation request; and waiting for a result returned by the network;

if a result that both the IPv4 and IPv6 are successfully supported is returned by the network, sending, by the wireless terminal device, an IPv4 de-activation request and an IPv6 de-activation request, setting, by the wireless terminal device, the IP type of the network as an IPv4v6 dual-PDP dual-stack, and entering the standby state;

initiating, by the wireless terminal device, after receiving a network connection instruction, a PDP activation request corresponding to the determined IP type supported by the network; and if a result that the PDP activation is performed successfully is returned by the network, establishing a data connection.

2. The method according to claim 1, further comprising: after sending, by the wireless terminal device, the IPv4 PDP activation request and the IPv6 PDP activation request, if a result that the IPv4 is successfully supported and the IPv6 is not supported is returned by the network, sending, by the wireless terminal device, the IPv4 de-activation request, setting, by the wireless terminal device, the IP type of the network as an IPv4 single-PDP single-stack, and entering the standby state.

3. The method according to claim 1, further comprising: after sending, by the wireless terminal device, the IPv4 PDP activation request and the IPv6 PDP activation request, if a result that the IPv4 is not supported and the IPv6 is successfully supported is returned by the network, sending, by the wireless terminal device, the IPv6 de-activation request, setting, by the wireless terminal device, the IP type of the network as an IPv6 single-PDP single-stack, and entering the standby state.

4. The method according to claim 1, further comprising: after sending, by the wireless terminal device, the IPv4 PDP activation request and the IPv6 PDP activation request, if a result that neither the IPv4 nor the IPv6 is supported is returned by the network, setting, by the wireless terminal device, the IP type of the network as unknown, and entering the standby state.

5. A wireless terminal device for rapidly establishing a dual-stack wireless connection, comprising: a network connection module and a network Internet Protocol (IP) type searching module; wherein, the network IP type searching module is configured to
after being registered onto a wireless network, send an IPv4v6 single packet data protocol (PDP) activation requests, and wait for a result returned by the network;

if a result that the IPv4v6 single-PDP activation is performed successfully is returned by the network, send an IPv4v6 de-activation request, set the IP type of the network as an IPv4v6 single-PDP dual-stack, and the wireless terminal device enters a standby state;

otherwise, send an IPv4 PDP activation request and an IPv6 PDP activation request, and wait for a result returned by the network;

if a result that both the IPv4 and IPv6 are successfully supported is returned by the network, send an IPv4 de-activation request and an IPv6 de-activation request, set the IP type of the network as an IPv4v6 dual-PDP dual-stack, and the wireless terminal device enters the standby state; and the network connection module is configured to, after receiving a network connection instruction, initiate a PDP activation request corresponding to the determined IP type supported by the network.

6. The wireless terminal device according to claim 5, further comprising: after the network IP type searching module sends the IPv4 PDP activation request and the IPv6 PDP activation request, if a result that the IPv4 is successfully supported and the IPv6 is not supported is returned by the network, the network IP type searching module is further configured to send the IPv4 de-activation request, sets the IP type of the network as an IPv4 single-PDP single-stack, and the wireless terminal device enters the standby state.

7. The wireless terminal device according to claim 5, further comprising: after the network IP type searching module sends the IPv4 PDP activation request and the IPv6 PDP activation request, if a result that the IPv4 is not supported and the IPv6 is successfully supported is returned by the network, the network IP type searching module is further configured to send an IPv6 de-activation request, sets the IP type of the network as an IPv6 single-PDP single-stack, and the wireless terminal device enters the standby state.

8. The wireless terminal device according to claim 5, after the network IP type searching module sends the IPv4 PDP activation request and the IPv6 PDP activation request, if to result that neither the IPv4 nor the IPv6 is supported is returned by the network, the network IP type searching module is further configured to set the IP type of the network as unknown, and the wireless terminal device enters the standby state.

* * * * *